Dec. 25, 1962   R. A. McKINNON   3,070,565
APPARATUS FOR IMPROVED THRUST CUT-OFF
Filed June 10, 1959   2 Sheets-Sheet 1
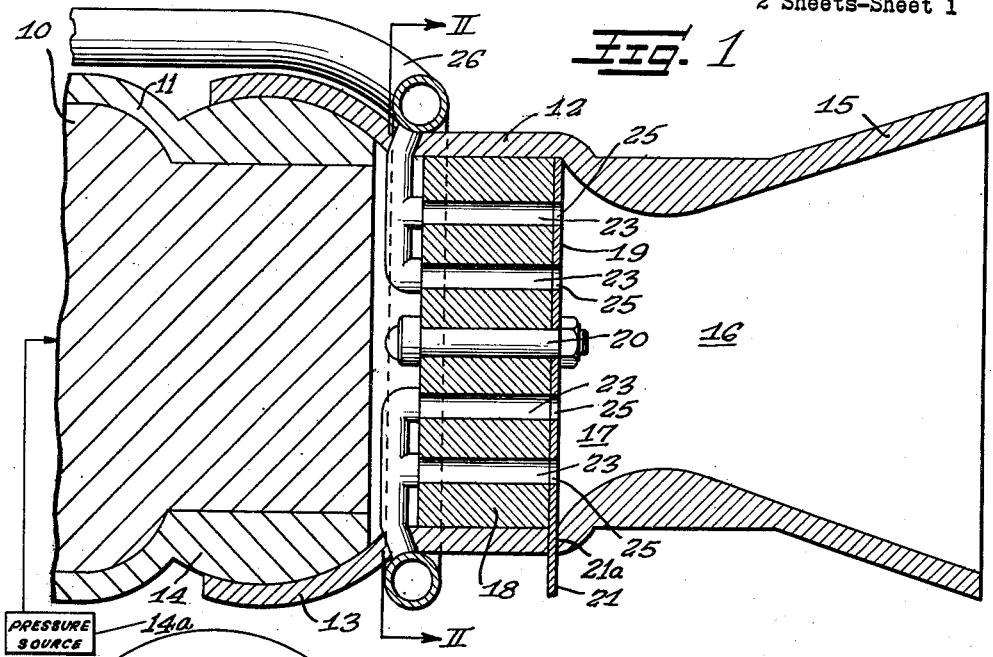
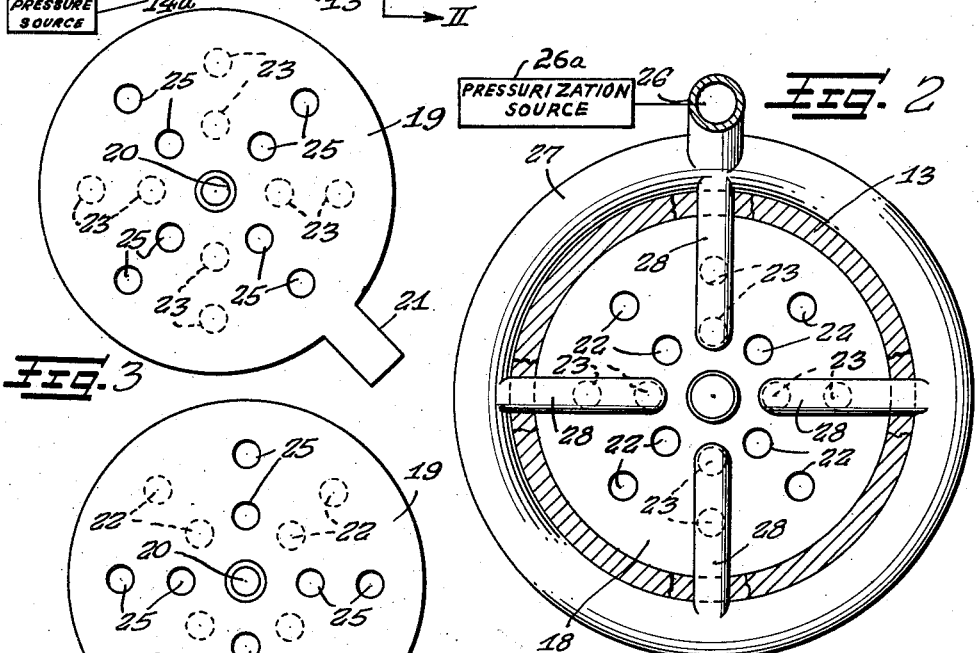
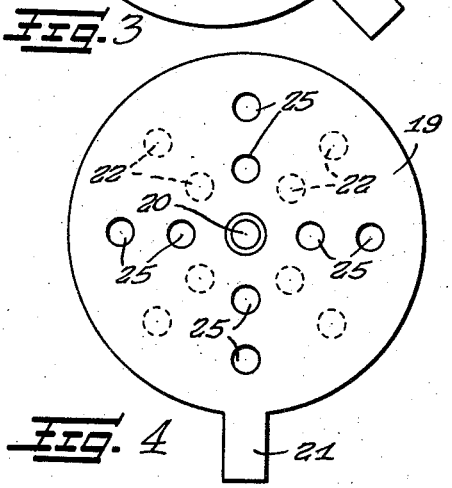
Inventor
Roy A. McKinnon

Dec. 25, 1962 R. A. McKINNON 3,070,565
APPARATUS FOR IMPROVED THRUST CUT-OFF
Filed June 10, 1959 2 Sheets-Sheet 2
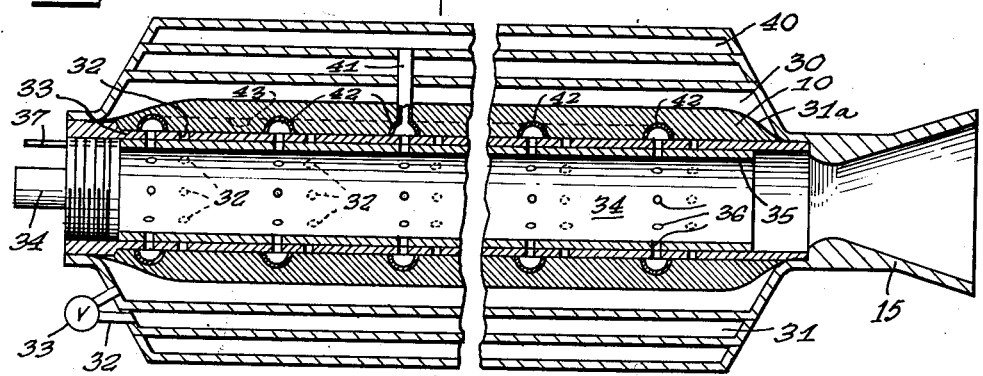
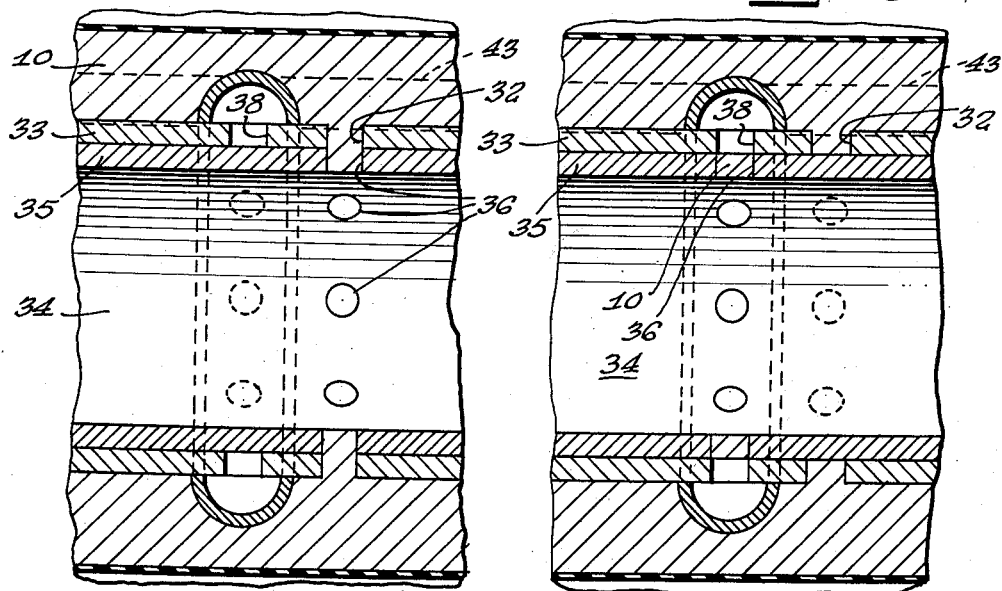
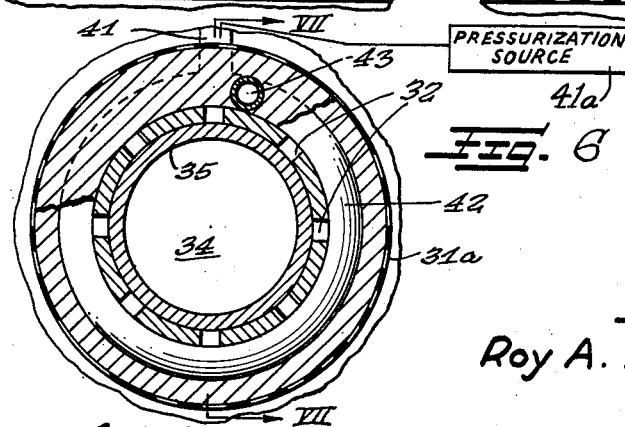
Inventor
Roy A. McKinnon United States Patent Office 3,070,565
Patented Dec. 25, 1962

3,070,565
APPARATUS FOR IMPROVED THRUST CUT-OFF
Roy A. McKinnon, Cleveland, Ohio, assignor to Thompson Ramo Wooldridge Inc., Cleveland, Ohio, a corporation of Ohio
Filed June 10, 1959, Ser. No. 819,405
7 Claims. (Cl. 60—35.6)

This invention relates to apparatus for improved thrust cut-off in a rocket engine. More particularly, this invention relates to such apparatus for stopping the operation of a gelatinous monopropellant fueled rocket engine in such a fashion that the extrusion plate through which the fuel is extruded into a combustion chamber will not be burned and hence destroyed by repeated stopping operations.

There have recently been developed various forms of gelatinous monopropellant fuels which have been found to have many distinct advantages over jellied, liquid, or solid fuels heretofore commonly used in rocket engines. Such gelatinous fuels are normally extruded through an extrusion member containing a plurality of extrusion orifices from a fuel storage tank into a combustion chamber where the fuel is burned. When it is desired to stop the operation of such an engine, it is frequently desirable in order to assure positive fast cut-off to provide a cut-off plate which may rotate or slide with respect to the extrusion member so as to block the passages thereof and prevent the further extrusion of fuel. During the normal operation of the engine such a cut-off plate or member is positioned so that holes or apertures in the cut-off member are aligned with the extrusion orifices or apertures in the extrusion member to form a continuation thereof. Hence, during normal operation the fuel is extruded from a fuel tank through apertures in the extrusion member, through coaligned apertures in the cut-off plate and thence into the combustion chamber. When it is desired to stop the engine the cut-off plate or member is rotated thereby slicing off a portion of the column or strip of fuel being extruded and preventing the further extrusion of any additional fuel. However, the part of the fuel column which was in the aperture in the cut-off plate at the time it was rotated will normally continue to burn and will hence bring the burning surface back into the cutoff plate and flush with the extrusion member. Since in the normal operation of the engine the fuel is burned in a protruding column extending away from the extrusion member and cut-off plate, this burning back into the cut-off plate is an abnormal situation which can in time seriously damage or char the cut-off plate and/or the extrusion member. This is particularly true when, as is often the case, the extrusion member is desirably made from a resinous plastic such as "Teflon."

It is therefore an object of this invention to provide improved thrust cut-off apparatus wherein an extrusion member for a gelatinous fuel is provided with a movable cut-off plate cooperating therewith to stop the further extrusion of fuel and is also provided with means to prevent continued combustion of the fuel in the cut-off plate when the engine is stopped.

It is a further object of this invention to provide improved thrust cut-off apparatus for a gelatinous fueled rocket engine wherein means are provided to prevent damage to the apparatus by fuel which would normally continue to burn in the apparatus.

It is a further object of this invention to provide improved thrust cut-off apparatus wherein a cut-off plate is provided with clean out means which serve not only to prevent damage to the plate but which also increases the speed at which cut-off can be achieved.

Other objects, features, and advantages of the present invention will be more fully apparent to those skilled in the art from the following detailed description taken in connection with the accompanying drawings in which like reference characters refer to like parts throughout and wherein:

FIGURE 1 is a longitudinal sectional view showing an extrusion member and cut-off plate mounted between a fuel tank exit and a combustion chamber and provided with improved thrust cut-off apparatus in accordance with the present invention.

FIGURE 2 is a sectional view taken on the line II—II of FIGURE 1.

FIGURE 3 is a plan view of the cut-off plate member showing the cut-off plate in its normal position in which the rocket engine is in operation.

FIGURE 4 is a plan view of the cut-off plate similar to FIGURE 3 but showing the cut-off plate in the cut-off positon in which the rocket engine is stopped.

FIGURE 5 is a longitudinal sectional view through a second embodiment of rocket engine having an internal combustion chamber provided with a cylindrical improved thrust cut-off plate member in accordance with the present invention.

FIGURE 6 is a sectional view taken on line VI—VI of FIGURE 5.

FIGURE 7 is a sectional view taken on the line VII—VII of FIGURE 6 and showing the cut-off cylinder in normal position which it occupies when the rocket engine is in operation.

FIGURE 8 is a sectional view similar to FIGURE 7 but showing the cylindrical cut-off member in the position occupied by it in the cut-off position in which the rocket engine is stopped.

The term monopropellant refers to a composition which is substantially self-sufficient with regard to its oxidant requirements as distinguished from bipropellants where the fuel is maintained separately from the oxidizer source until admixture at the point of combustion. The present invention is directed to a rocket engine structure adapted to burn a gelatinous monopropellant to generate thrust. Although the engine structure is not restricted to use with any particular monopropellant, it is nonetheless true that the monopropellant used should possess certain requisite physical characteristics. It should be sufficiently cohesive to retain its shape for an appreciable length of time when extruded. Preferably also, its cohesive strength should be sufficiently high to withstand fragmentation under the given conditions in the combustion chamber. This is of importance not only for control of the desired burning surface area, but to avoid loss or wastage of unburned propellant by venting of the material out of the nozzle under such conditions as high acceleration. This is frequently a problem in the case of the burning of atomized mobile liquid propellants, some unburned particles of which fly out of the rocket nozzle. The degree of cohesive strength desirable is determined to some extent by the particular stresses developed in a particular use and the particular burning conditions as, for example, the unsupported length of the extruding, burning mass. Cohesive strength is closely related to the tensile strength of the material. In general, for the desired shape-retentivity, the monopropellant material should preferably have a minimum tensile strength of about 0.01 lb./sq. in., preferably about 0.03 p.s.i. or higher.

The cohesiveness or substantial tensile strength of the monopropellant maintains stability and uniform dispersion of its components as, for example, in the case of two-phase systems containing dispersed insoluble, solid oxidizer. This is of considerable importance, since it ensures uniformity of burning rate at the constantly generating burning surface as the end-burning material advances, thereby assuring a constant or controllable rate of gas generation.

The monopropellant, furthermore, should be extrudable at ambient temperatures, namely, should be capable of continuous flow, preferably under relatively moderate pressure differentials. Materials which are extrudable only at elevated temperatures or which require excessively high pressures to initiate and maintain flow present problems which make them generally unsuitable. In general, it is desirable to employ a material which flows at a maximum shear stress of about 10 p.s.i. at the wall of the tube or orifice through which it is being extruded.

The controllable feeding of a monopropellant having both shape-retentiveness and fluidity under stress substantially eliminates still another difficulty encountered with solid propellants housed in the combustion chamber, namely, the dangers of fracturing or cracking of the solid propellant which can so enormously increase burning surface area and the amount of gases produced as to cause explosion of the combustion chamber. The brittleness and fissuring characteristics of many solid propellants at low ambient temperatures is no problem with monopropellants having the physical characteristics requisite for my purpose since they can either be formulated so as to have exceedingly low freezing points or, upon warming to ambient temperatures of use, regain their flow characteristics and form a continuous, unbroken mass during pressure extrusion.

Substantially any monopropellant composition having the requisite physical characteristics, as for example, gelled liquid monopropellants such as hydrazine nitrate, nitromethane, or ethylene oxide containing a suitable gelling agent can be employed. One of the important advantages of the invention, however, stems from the fact that it makes possible the utilization of propellant compositions possessing the highly desirable characteristics of solid propellants in terms, for example, of the high density and high impulse required for high performance levels and reduced storage volume requirements with the important concomitant advantages of propellant feed control and, thereby, control of gas generation under varying circumstances.

Double-base propellant compositions comprising nitrocellulose gelatinized with nitroglycerin with or without, but preferably with, an inert, non-volatile plasticizer such as triacetin, diethyl phthalate, dibutyl phthalate or dibutyl sebacate, to reduce impact sensitivity, in proportions producing a soft gel having the requisite shape retentiveness and flow characteristics are suitable for use. Such relatively high-density, high-impulse propellants have hitherto been utilized only as solid propellants with the predesigning, presizing and other disadvantages entailed by this mode of use.

In general, gel compositions comprising about 3 to 25% nitrocellulose dissolved in nitroglycerin, desirably diluted with at least about 10%, but preferably at least 20 to 30% by weight based on total liquid, of an inert plasticizer solvent to reduce sensitivity, possess the requisite physical properties. Such soft gel compositions also have the advantage of being admixable with finely divided insoluble solid oxidizer such as the ammonium, sodium and potassium perchlorates and nitrates, to provide for combustion of the inert plasticizer, while retaining the desired shape-retentive, extrudable characteristics. Other highly active propellant liquids, such as pentaerythritol trinitrate, 1,2,4-butanetriol trinitrate, and diethylene-glycol dinitrate, which normally are too sensitive for use as mobile liquid monopropellants, can also be gelatinized with nitrocellulose, with or without inert plasticizer diluent and with or without finely divided solid, insoluble oxidizer, to provide monopropellants of substantially higher density than presently usable mobile liquid monopropellants.

Still another advantage of the apparatus lies in the fact that it makes possible combustion with controllable feeding and gas generation rates of heterogeneous monopropellants which are characterized not only by high density and high impulse, but also by the high autoignition temperature, low shock-and impact-sensitivity, noncorrosiveness and non-toxity of many of the presently used solid composite-type propellants, which make them safe to handle, to transport and to store for extended periods of time under substantially any environmental temperature conditions likely to be encountered. By heterogeneous is meant a two-phase system wherein a finely divided, solid oxidizer is dispersed in an organic liquid fuel in which the oxidizer is insoluble. Spraying or atomization into a combustion chamber of dispersions of a solid oxidizer in a liquid fuel, even where the solid is present in sufficiently small amounts so that the slurry is free-flowing, is not feasible. The solid tends to clog the small atomization orifices. Comminution of the composition into a finely divided spray in the combustion chamber also posed reaction problems because of the difficulty in maintaining the solid oxidizer phase and the liquid phase in properly proportioned contact for complete oxidation.

Heterogeneous monopropellant compositions which are particularly advantageous comprise stable dispersions of finely divided, insoluble solid oxidizer in a continuous matrix of a nonvolatile, substantially shock-insensitive liquid fuel, the composition having sufficiently high cohesive strength to form a plastic mass which maintains the solid oxidizer in stable, uniform dispersion and which, while capable of continuous flow at ambient temperatures under stress, nevertheless retains a formed shape for an appreciable length of time. The compositions, which preferably are soft gels, possess the characteristics of non-Newtonian liquids, namely yield to flow only under a finite stress.

The liquid fuel can be any oxidizable liquid which is preferably high boiling and substantially nonvolatile, which is preferably free-flowing or mobile at ordinary temperatures, and which is substantially inert or insensitive to shock or impact. The latter characteristic can be achieved by employing an oxidizable liquid, at least about 50% by weight of which is an inert compound requiring an external oxidizer for combustion. For special applications, an active liquid fuel containing combined oxygen available for combustion of other components of the molecule, such as nitroglycerin, diethylene glycol dinitrate, pentaerythritol trinitrate or 1,2,4-butanetriol trinitrate, can be admixed with the inert fuel component, such dilution serving substantially to nullify the sensitivity of the active component.

The inert liquid is preferably an organic liquid which, in addition to carbon and hydrogen, can contain other elements such as oxygen, nitrogen, sulfur, phosphorus or silicon and which meets the aforedescribed requirements in terms of physical and chemical properties. Such liquid fuels include hydrocarbons, e.g., triethyl benzene, dodecane and the like; compounds containing some oxygen linked to a carbon atom, such as esters, e.g., dimethyl maleate, diethyl phthalate, dibutyl oxalate, etc.; alcohols, e.g., benzyl alcohol, diethylene glycol, triethylene glycol, etc., ethers, e.g., methyl o-naphthyl ether; ketones, e.g., benzyl methyl ketone, phenyl ketone, isophorone; acids, e.g., 2-ethylhexoic acid, caproic acid, n-heptylic acid, etc., aldehydes, e.g., cinnamaldehyde; nitrogen-containing organic compounds such as amines, e.g., N-ethylphenylamine, tri-n-butylamine, diethyl aniline; e.g., caprinitrile; phosphorus-containing compounds, e.g., triethyl phosphate; sulfur-containing compounds, e.g., diethyl sulfate; pentamethyl disilocylmethyl methacrylate, viscous liquid polymers, such as polyisobutylene, and many others.

The solid oxidizer can be any suitable, active oxidizing agent which yields oxygen readily for combustion of the fuel and which is insoluble in the liquid fuel vehicle. Suitable oxidizers include the inorganic oxidizing salts, such as ammonium, sodium, potassium and lithium perchlorate or nitrate, and metal peroxides such as barium peroxide. The solid oxidizer should be finely divided, preferably with a maximum particle size of about 300 to 600 microns, to ensure stable, uniform dispersion of the oxidizer despite lengthy storage periods, although some somewhat larger particles can be maintained in gelled compositions without separation.

The amount of liquid fuel vehicle in the composition is critical only insofar as an adequate amount must be present to provide a continuous matrix in which the solid phase is dispersed. This will vary to some extent with the particular solids dispersed, their shape and degree of subdivision and can readily be determined by routine test formulation. The minimum amount of liquid required generally is about 8%, usually about 10%, by weight. Beyond the requisite minimum any desired proportion of liquid fuel to dispersed solid can be employed, depending on the desired combustion properties, since the desired cohesive, shape-retentive properties can be obtained by additives such as gelling agents. Where the requisite cohesiveness and plasticity are obtained by proper size distribution of the finely divided solid, without an additional gelling agent, the amount of solid incorporated should be sufficient to provide the consistency essential for shape-retentiveness. This will vary with the particular liquid vehicle, the particular solid and its size distribution and can readily be determined by routine testing. The requisite physical properties of the plastic heterogeneous monopropellant can also be obtained without the use of a gelling agent by employing a viscous liquid vehicle, such as a relatively low molecular weight liquid polymer.

Thixotropic, plastic, shape-retentive compositions having the desired flow characteristics can be made by incorporating sufficient finely divided solid, insoluble oxidizer into the liquid fuel to make an extrudable mass when particles are so distributed that the minimum ratio of size of the largest to the smallest particles is about 2:1 and preferably about 10:1. At least 90% of the particles by weight should preferably have a maximum size of about 300 microns. Above this, a small proportion by weight up to about 600 microns can be tolerated.

It is sometimes desirable to incorporate a gelling agent in the solid oxidizer-liquid fuel dispersion. Such gels possess the desired dispersion stability, cohesiveness, shape-retentiveness and flow characteristics. Any gelling agent which forms a gel with the particular liquid fuel can be employed. Examples of compatible gelling agents include natural and synthetic polymers such as polyvinyl chloride; polyvinyl acetate; cellulose esters, e.g., cellulose acetate and cellulose acetate butyrate; cellulose ethers, e.g., ethyl cellulose and carboxymethyl cellulose; metal salts of higher fatty acids such as the Na, Mg, and Al stearates, palmitates and the like; salts of napthhenic acid; casein; karaya gum; gelatin; bentonite clays and amine-treated bentonite clays; etc. Organic gelling agents are preferred since they can also serve as fuels. The amount of gelling agent employed is largely determined by the particular liquid fuel, the particular gelling agent, the amount of dispersed solid, and the specific physical properties desired.

Particle size distribution of the dispersed solids is generally not an important factor in imparting cohesive, plastic properties to the composition and in minimizing separation where a gelling agent is employed since these factors are adequately provided for by the gel. Even some substantially large solid particles as, for example, up to about 1000 microns, can be held in stable dispersion. However, the presence of different size particles is often desirable because of the improved packing effect obtained, in terms of increased amounts of solids which can be incorporated.

Finely divided, solid metal powders, such as Al, Mg, Zr, B, Be, Ti, Si, or the like, can be incorporated in the monopropellant compositions as an additional fuel component along with the liquid fuel. Such metal powders possess the advantages both of increasing density and improving specific implse of the monopropellant because of their high heats of combustion. The metal particles should preferably be within a size range of 0.25 to 50 microns. The amount of such metal fuel added is not critical but is determined largely by the specific use and the requisite physical characteristics of the composition as aforedescribed. For example, it should not be incorporated in such large amounts that the mixture either becomes granular in texture or deficient in amount of oxidizer. In general, the maximum amount of metal powder which can be introduced while maintaining the desired physical properties of the composition and an adequate amount of solid oxidizer is about 45% by weight, and depends upon the density of the metal and its chemical valence or oxidant requirement for combustion.

The amount of oxidizer can be less than stoichiometric so long as sufficient is introduced to maintain active combustion and a desired level of gas generation. The presence of an active liquid fuel component, namely a fuel containing oxygen avilable for combustion, reduces, of course, the amount of solid oxidizer required.

A gelatinous monopropellant fuel having the foregoing characteristics is indicated generally by the reference character 10 in the drawings. The fuel 10 is stored in a generally cylindrical fuel tank 11 having a rearward reduced exit portion 14 through which the fuel may be extruded by the application of pressure forces from a pressurization system 14a. Mounted on the rearward portion 14 of fuel tank 11 is a combustion chamber defining wall 12 which may be integrally or adjustably attached to the portion 11 as by the gimbal or flange member 13. The combustion chamber defining wall 12 is shown merging integrally with a wall member 15 of a discharge nozzle having a throat area 16 immediately in back of the combustion chamber 17.

Positioned and supported within the combustion chamber defining wall 12 is an extrusion member 18 on which is mounted a cut-off plate 19 which may be supported for rotation with respect to the rearward surface of the extrusion member 18 by a nut and bolt arrangement 20 or by any other suitable lug fastening means. The cut-off plate 19 is provided with a lever arm 21 extending through a slot 21a formed in the wall which may serve to actuate the plate for rotary movement in a manner to be described in detail below. Seal means (not shown) are provided to prevent leakage of gases through the slot 21a to atmosphere.

Referring now in particular to FIGURES 2, 3 and 4 it will be seen that the fuel extrusion member 18 is provided with a first group or plurality of active fuel extrusion apertures or passages 22, the axial centers of which are positioned on orthogonal diameters of the circular cross-section of the cylindrical extrusion member 18. The extrusion member 18 is also provided with a second group or plurality of inert gel or inert material extrusion apertures or passages indicated by the reference character 23. It will be noted that in FIGURE 2 the active gel fuel passages 22 are seen in a full line view and the inert gel passages 23 are seen in phantom whereas in FIGURE 1 the reverse is true, that is, the inert gel passages 23 are shown in section whereas the active fuel passages 22 are not seen. This of course follows from the fact that the inert gel passages 23 are also positioned so that their axial centers also lie on orthogonal diameters of the circular cross-section of the cylindrical extrusion member 18 but the diameters on which the centers of the inert gel passages 23 are positioned are at a 45° angle with the diameters on which the active gel fuel passages 22 are positioned.

The cut-off plate member 19 as may be seen in FIGURES 3 and 4 is provided with a single group of apertures or orifices having a cross-section the same as the cross-section of the apertures or orifices in extrusion member 18 and which are also positioned to be coaligned with the apertures in the extrusion member 18. That is to say, the apertures 25 in the cut-off member 19 are also positioned on orthogonal diameters of the cut-off plate 19 which has a cross-sectional shape the same as the cross-sectional shape of the extrusion member 18. Furthermore, the orifices 25 in the cut-off plate 19 are positioned so that in a first angular position of the cut-off plate as shown in FIGURE 3 the orifices 25 are aligned with and form a continuation of the active gel fuel passages 22 in the extrusion member 18 whereas if the cut-off plate 19 is rotated through a 45° angle to the position shown in FIGURE 4 the apertures 25 in plate 19 are aligned with the inert gel or other inert material passages 23 in the extrusion member 18. When assembled, the cut-off plate 19 is in contact with the extrusion member 18. Briefly, in the position shown in FIGURE 3, the cut-off plate 19 is in what may be termed the on position in which fuel 10 from fuel tank 11 may be extruded through apertures or orifices 22 and thence through orifices 25 into the combustion chamber 17 whereas in the position shown in FIGURE 4 the cut-off plate 19 is in what may be termed the off position in which the fuel extrusion passages 22 are blocked by the plate member 19 and the orifices 25 in the plate member 19 are aligned with the inert gel passages 23 through which an inert gel material or compressed air or other compressed inert gases may be extruded or blown under pressure in order to remove from the orifices 25 any fuel remaining therein from the previous operation of the engine.

It will be apparent that in FIGURE 1 the cut-off plate 19 is shown in the off position corresponding to that shown in FIGURE 4.

The inert gelatinous material or compressed air may be supplied from any suitable storage tank of a conventional pressure system 26a through a conduit 26 leading to an annular manifold 27. Feeder pipes 28 supply the clean out material from manifold 27 to the orifices or apertures 23 through which the material is extruded or blown to clean out the gelatinous fuel remaining in apertures 25 after operation of the engine. As noted above, the clean out material may be air or any inert gas which is applied under pressure or it may be an inert gelatinous material formed by omitting the fuel component from the above described gelatinous fuel or it may be any other suitable inert putty like substance.

In FIGURES 5 through 8 there is shown an adaptation of the invention described above to a gelatinous monopropellant fueled rocket engine of the type employing a cylindrical internal combustion chamber provided with a cylindrical cut-off sleeve rather than with a flat cut-off plate of the type described above in connection with the external type of combustion chamber. In FIGURE 5 there is shown such a rocket engine wherein the gelatinous fuel 10 is contained in a generally cylindrical fuel tank 30 containing a flexible or collapsible bladder 31a which acts to extrude the fuel 10 in a manner to be described below. Surrounding the generally cylindrical fuel tank 30 is a concentric generally cylindrical pressurized gas tank 31. Inert gas from tank 31 may be admitted to tank 30 in order to collapse the flexible bladder 31a. When the bladder 31a is collapsed it normally extrudes the fuel 10 through apertures 32 in the fixed wall 33 of the internal combustion chamber.

Mounted in the forward end of the combustion chamber is an ignition and closure element 34 which may be a squib or any known device for initially generating a blast of hot gases to ignite the fuel 10 extruded through apertures 32 into the fuel tank. Ignition device 34 may, for example, be a charge of solid fuel ignitable by an electrical heating element in a manner well known in the art.

The burning of the fuel 10 in the combustion chamber 34 generates gases which are discharged through a nozzle 15 to produce the normal thrust of the engine.

Mounted within the wall 33 of combustion chamber 34 and concentrically slidable inside this wall and in contact therewith is a sleeve cut-off member 35 having a plurality of apertures 36 therein. The sleeve member 35 is adapted to be slidably moved back and forth in the combustion chamber wall defining member 33 by an arm member 37 which projects through the forward ignition and closure member 34 and which in turn may be actuated by any suitable mechanical or electrical means. In the position shown in FIGURES 5, 6 and 8 the cylindrical sleeve cut-off member 35 is positioned such that the aperture 36 therein are out of alignment with the fuel extrusion apertures 32 thereby preventing extrusion of fuel and are in alignment with a set of apertures 38 through which the above discussed inert gelatinous material, compressed air or gas, or the like are adapted to be extruded to clean out the fuel which may have been left in the aperture 36. In the position shown in FIGURE 7, on the other hand, the sleeve member 35 is positioned in the member 33 in such a fashion that the apertures 36 are aligned with the aperture 32 in member 33 which communicates directly with the fuel tank 30. The gelatinous fuel 10 may therefore be extruded directly into the combustion chamber 34.

In the embodiment shown in FIGURES 5 through 8 an annular tank 40 is provided and is positioned concentrally around the tanks 30 and 31, the tank 40 containing the compressed gas or other medium to be used in cleaning the extrusion apertures of the cylindrical cut-off member 35. Leading from tank 40 is a conduit 41 which may contain a valve controlling the flow of gas therethrough (not shown) and which leads to a first annular header 42 which surrounds the wall member 33 of combustion chamber 34 and which closes the aperture 38 off from the fuel tank 30. Compressed gas or other clean-out medium from tank 40 may be applied through conduits 41 and manifold 42 to the apertures 38 in wall member 33 from a conventional pressurization system 41a. When apertures 36 are aligned with apertures 38 the cleaning medium will of course be applied to the apertures 36. A similar annular header 42 may be provided for each set of apertures 38 which occur longitudinally of the fuel tank. These annular or circumferential headers 42 may in turn be connected by a longitudinally extending header 43 which, as positioned in FIGURE 6, may conveniently be positioned to one side of the apertures 32 through which fuel is normally extruded into combustion chamber 34.

The embodiment of FIGURES 5 through 8 operates in a manner entirely similar to the embodiment of FIGURES 1 through 4 the only difference being that the second embodiment uses a cylindrical cut-off sleeve member adapted for operation in a cylindrical internal combustion chamber whereas the first embodiment uses a flat rotary plate cut-off member adapted for use in an external rearwardly positioned combustion chamber in which the extrusion orifices are positioned transversely of the combustion chamber rather than longitudinally thereof as in the internal configuration. In either embodiment, the cut-off member is provided with a first set of apertures which may assume either of two positions. In one position the apertures in the cut-off plate are coaligned with fuel extrusion apertures in an extrusion member whereas in the other position the apertures in the cut-off plate are coaligned with a cleaning material extrusion orifice adapted to supply material which will remove residual fuel from the apertures in the cut-off member. During the normal operation of the engine the cut-off member is positioned in the first position so that fuel may be extruded from a fuel tank into a combustion chamber through the coaligned apertures in the extrusion member and the cut-off member. The engine may be stopped by moving the cut-off member to its second position thereby blocking the fuel extrusion orifices in the extrusion member. When the cut-off member is so moved a small residue of fuel will normally adhere in the apertures in the cut-off member. In the second position to which the cut-off member is moved the apertures therein are coaligned with apertures through which the cleaning material may be extruded to remove this residual fuel thereby more quickly stopping all combustion in the combustion chamber and preventing any possibility of further burning of the residual fuel causing damage to the cut-off member or to portions of the extrusion member.

While particular exemplary preferred embodiments of the invention have been described in detail above, it will be understood that modifications and variations therein may be effected without departing from the true spirit and scope of the novel concept of the present invention as defined by the following claims.

I claim as my invention:

1. In a gelatinous monopropellant fueled rocket engine, an extrusion member having first and second sets of orifices therein, a cut-off member having a third set of orifices therein and being mounted in contact with the extrusion member for movement between first and second positions with respect to said extrusion member, said third set of orifices being coaligned with said first set of orifices in said first position and with said second set of orifices in said second position, means to extrude a gelatinous fuel through said first and third sets of orifices, and means to extrude an inert cleaning material through said second and third sets of orifices to remove residual fuel from said third set of orifices when said cut-off member is moved from said first to said second position.

2. In a gelatinous monopropellant fueled rocket engine of the type having a fuel tank adapted to contain said fuel, a combustion chamber in which said fuel is burned to generate thrust producing gases, and an extrusion member having orifices extending between said fuel tank and said combustion chamber through which said fuel may be extruded into said combustion chamber, the improvement comprising, first and second sets of orifices in said extrusion member, a cut-off member mounted in contact with said extrusion member and movable between first and second position with respect to said extrusion member, a third set of orifices in said cut-off member, said third set of orifices being coaligned with said first set of orifices in said first position of said cut-off member and being coaligned with said second set of orifices in said second position of said cut-off member, means to extrude said gelatinous fuel through said first and third sets of orifices when said cut-off member is in said first position, means to ignite said extruded fuel, and means to move said cut-off member from said first to said second position to stop the operation of said engine and prevent further extrusion of said fuel, and means to extrude an inert cleaning material through said second and third sets of orifices to remove residual fuel from said third set of orifices when said cut-off member has been moved from said first to said second position.

3. In a gelatinous monopropellant fueled rocket engine of the type having a generally cylindrical fuel tank adapted to contain said fuel, pressure actuated means to extrude said fuel from said tank, a combustion chamber in which said fuel is burned, and an extrusion member positioned between said fuel tank and said combustion chamber, the improvement comprising, first and second sets of orifices in said extrusion member, a rotatably mounted plate member having the same cross-sectional shape as said extrusion member and being mounted contiguous and in contact with one end of said extrusion member for rotation about the axis thereof, a third set of orifices in said plate member, said third of said orifices being coaligned with said first set of orifices in said first position and with said second set of orifices in said second position, means to extrude said gelatinous fuel through said first and third sets of orifices, and means to extrude an inert cleaning material through said second and third sets of orifices to remove residual fuel from said third set of orifices when said plate member is moved from said first to said second position.

4. In a gelatinous monopropellant fueled rocket engine, a first generally cylindrical combustion chamber defining wall member, said wall member defining a combustion chamber which is closed at its forward end and which is open at its rearward end to discharge gases generated therein, a generally cylindrical fuel tank coaxial with and surrounding said combustion chamber, said combustion chamber defining wall member having first and second sets of orifices therein, a sleeve shaped cut-off member slidably mounted inside and in contact with said combustion chamber defining wall member, said cut-off member having a third set of orifices therein and being slidable between first and second positions with respect to said combustion chamber wall member, said third set of orifices being co-aligned with said first set of orifices in said first position and with said second set of orifices in said second position, means to extrude said gelatinous fuel through said first and third sets of orifices when said cut-off member is in said first position, and means to extrude an inert cleaning material through said second and third sets of orifices to remove residual fuel from said third set of orifices when said cut-off member is moved from said first to said second position.

5. In a gelatinous monopropellant fueled rocket engine, an extrusion member having first and second sets of orifices therein, a cut-off member in contact with said extrusion member and having a third set of orifices therein and being mounted for movement between first and second positions with respect to said extrusion member, said third set of orifices being coaligned with said first set of orifices in said first position and with said second set of orifices in said second position, said extrusion member being positioned between a fuel tank adapted to contain said fuel and a combustion chamber in which said fuel is adapted to be burned, means to extrude said fuel from said fuel tank through said first and third sets of orifices when said cut-off member is in said first position, means to ignite said extruded fuel in said combustion chamber, means to move said cut-off member to said second position to stop the operation of said engine, and means to extrude an inert cleaning material through said second and third sets of orifices to remove residual fuel from said third set of orifices when said cut-off member is moved from said first to said second position.

6. In a gelatinous monopropellant fueled rocket engine, a generally cylindrical extrusion plug member, said extrusion member being positioned between a fuel tank adapted to contain said fuel and a combustion chamber in which said fuel is to be burned, said extrusion member having first and second sets of orifices therein, a cut-off plate member in contact with said extrusion member and having the same cross-section as the cross-section of the outlet end of said extrusion member, said cut-off member benig coaxially mounted with said extrusion member for rotation with respect to said extrusion member, said cut-off plate member having a third set of orifices therein which are movable with said plate between first and second positions with respect to said extrusion member, said third set of orifices being coaligned with said first set of orifices in said first position and with said second set of orifices in said second position, means to extrude said gelatinous fuel through said first and second sets of orifices in said first position, means to ignite said fuel in said combustion chamber, means to move said cut-off plate to said second position to stop the operation of said engine, and means to extrude an inert cleaning material through said second and third sets of orifices to remove residual fuel from said third sets of orifices after said cut-off member is moved from said first to said second position.

7. In a gelatinous monopropellant fueled rocket engine, a tubular extrusion member having first and second sets of orifices therein and defining the wall of a combustion chamber, a sleeve shaped cut-off member in contact with said extrusion member and coaxially mounted for sliding movement within said extrusion member, said cut-off member having a third set of orifices therein which are movable between first and second positions with respect to said extrusion member, said third set of orifices being coaligned with said first set of orifices in said first position and with said second set of orifices in said second position, means to extrude a gelatinous fuel through said first and third sets of orifices, and means to extrude an inert cleaning material through said second and third sets of orifices to remove the residual fuel from said third sets of orifices when said cut-off member is moved from said first to said second position.

References Cited in the file of this patent

UNITED STATES PATENTS

| | | |
|---|---|---|
| 1,506,323 | O'Neill | Aug. 26, 1924 |
| 2,945,344 | Hutchinson | July 19, 1960 |
| 2,988,879 | Wise | June 20, 1961 |

FOREIGN PATENTS

| | | |
|---|---|---|
| 333,229 | Germany | July 8, 1921 |
| 582,621 | Great Britain | Nov. 22, 1946 |